L. Mishler,
Hay Fork.
No. 2355.
33,359.
Patented Sep. 24, 1861.
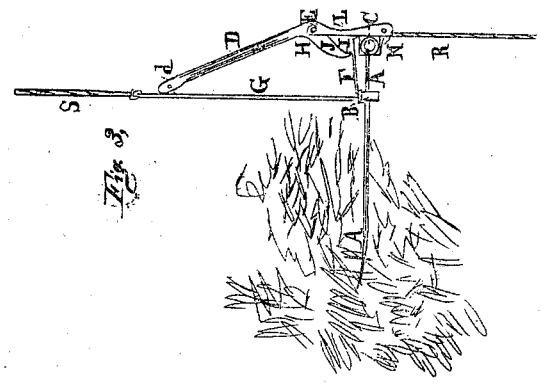
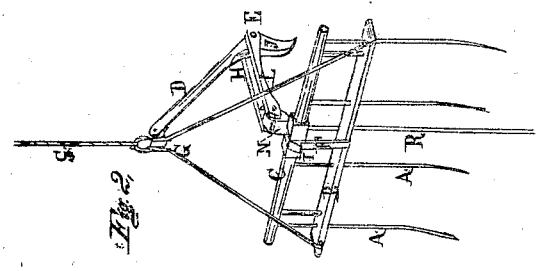
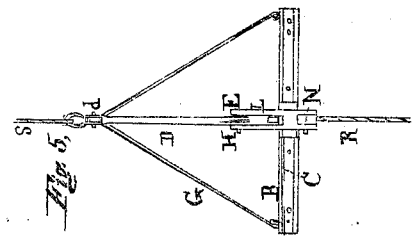
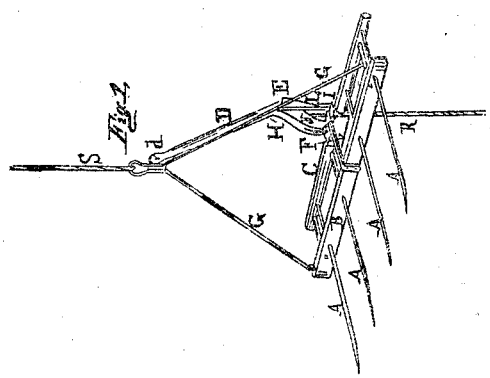
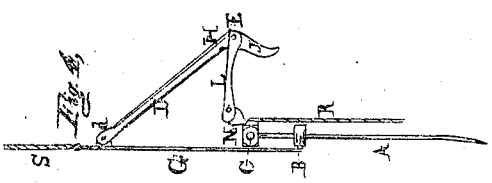

UNITED STATES PATENT OFFICE.

L. MISHLER, OF MOGADORE, OHIO.

IMPROVEMENT IN MACHINES FOR LOADING HAY.

Specification forming part of Letters Patent No. 33,359, dated September 24, 1861.

*To all whom it may concern:*

Be it known that I, L. MISHLER, of Mogadore, in the county of Portage and State of Ohio, have invented new and useful Improvements in an Apparatus for Loading and Unloading Hay; and I do hereby declare that the following is a full and complete description of the construction and operation of the same, reference being had to the accompanying drawings, making a part of this specification, in which—

Figures 1 and 2 are perspective views. Figs. 3 and 4 are side views. Fig. 5 is a back view.

Like letters denote like parts in the different views.

My improvement relates to an apparatus so arranged with a catch-spring and jointed lever that when the hay is being lifted from the ground to the load or from the load to the mow the apparatus is in the position shown in Figs. 1 and 3; but when it has reached the desired place, by applying power to the rope attached to the spring the lever is disengaged from the catch and the weight of hay on the fingers or tines, cause the tines to take a vertical position, in a line with the brace, as shown in Figs. 2 and 4, when the hay slides off. By again applying power to the rope connected to the spring the fingers are brought at right angles to the brace, prepared for lifting.

In the figures, A represents the fingers or tines, which may be more or less in number, passing through the frame B and secured to the head-piece C.

D is the upper part of the jointed lever H, having its fulcrum-joint at E, the lower part of which terminates in the piece J, that catches on the end of the spring F, which is secured to the frame B. The lower part, L, of the lever H moves on the pin E, and has its fulcrum in the piece N, secured to the middle of the head-piece C. The upper part of the jointed lever H moves on the pin *d*, by means of which it is connected to the brace G, which brace is secured to the ends of the frame B, to the upper end of which is attached the rope S, that passes over a pulley or sheave arranged in a frame above the wagon or in the beams of the mow, which can be operated by hand or horse power.

At the end of the spring F, to the catch I, is connected the rope R, by which the catch is pulled down to disengage it from the piece J, and by means of which the fingers are brought into a horizontal position when the hay is removed.

In practical operation, when all the parts are respectively in the position shown in Fig. 1, the operator takes hold of the head-piece C and forces the fingers into the hay in a vertical or inclined direction. Then, by applying power to the end of the rope S, a great quantity of hay can be elevated from the ground to the load or from the load to the mow, as shown in Fig. 3. When the hay is raised to the desired place, by pulling the rope R the piece J is released from the catch I, and the weight of hay on the fingers causes the lever and fingers to take the position shown in Figs. 2 and 4, when of course the hay will slide off. By again pulling the rope R the fingers and brace are brought at right angles to each other, prepared for lifting.

What I claim as my improvement, and desire to secure by Letters Patent, is—

The jointed lever H, with the piece J, and spring F, with the catch I, in combination with the brace G and fingers A, the whole being operated by the rope R, in the manner and for the purpose specified.

L. MISHLER.

Witnesses:
W. H. BURRIDGE,
HENRY VOTH.